United States Patent
Al Tarabsheh et al.

(10) Patent No.: US 10,612,522 B2
(45) Date of Patent: Apr. 7, 2020

(54) PHOTOVOLTAIC-WIND HYBRID TURBINE SYSTEM

(71) Applicant: Abu Dhabi University, Abu Dhabi (AE)

(72) Inventors: Anas I. Q. Al Tarabsheh, Abu Dhabi (AE); Muhammad Abdul Majeed Hareb, Abu Dhabi (AE); Mahmoud Raouf Kahla, Abu Dhabi (AE)

(73) Assignee: Abu Dhabi University, Abu Dhabi (AE)

( * ) Notice: Subject to any disclaimer, the term of this patent is extended or adjusted under 35 U.S.C. 154(b) by 0 days.

(21) Appl. No.: 15/995,760

(22) Filed: Jun. 1, 2018

(65) Prior Publication Data

US 2018/0372073 A1 Dec. 27, 2018

Related U.S. Application Data

(60) Provisional application No. 62/523,515, filed on Jun. 22, 2017.

(51) Int. Cl.
*F03D 9/00* (2016.01)
*F03D 9/11* (2016.01)
(Continued)

(52) U.S. Cl.
CPC .............. *F03D 9/007* (2013.01); *F03D 3/005* (2013.01); *F03D 3/065* (2013.01); *F03D 9/11* (2016.05); *H01R 43/10* (2013.01); *H02K 7/183* (2013.01); *H02K 11/0094* (2013.01); *H02K 11/35* (2016.01); *H02K 13/003* (2013.01); *H02S 10/12* (2014.12); *H02S 40/32* (2014.12); *H02S 40/38* (2014.12); *F05B 2220/708* (2013.01); *F05B 2230/60* (2013.01); *F05B 2240/214* (2013.01); *F05B 2270/303* (2013.01);
(Continued)

(58) Field of Classification Search
USPC ............................... 290/44, 55; 415/1; 416/1
See application file for complete search history.

(56) References Cited

U.S. PATENT DOCUMENTS 4,553,037 A * 11/1985 Veazey .................. F03D 13/25
290/55
7,008,171 B1 * 3/2006 Whitworth .............. F03D 3/061
415/4.2
(Continued)

*Primary Examiner* — Pedro J Cuevas

(57) ABSTRACT

There is provided a hybrid turbine system comprising a plurality of flexible and thin film photovoltaic modules or panels attached to a plurality of blades of a vertical-axis wind turbine (VAWT) for energy generation. Electrical performance of rotating photovoltaic modules or panels is enhanced since rotating photovoltaic modules are self-cooled by rotation of the blades of the wind turbine. It is experimentally shown that voltage of the photovoltaic modules decreases when the photovoltaic modules' temperature increases, and this decrease was modelled by four parameters namely ideality factor, reverse saturation current, short-circuit current, and material band gap. The present invention evidences that the proposed rotating photovoltaic modules increases the output voltage of the photovoltaic modules. Rotation of the photovoltaic modules as a part of the plurality of blades cools down and lowers the operating temperature of the photovoltaic modules and improves overall performance of the hybrid turbine system.

12 Claims, 8 Drawing Sheets

(a)

(b)

(51) Int. Cl.
*H02K 7/18* (2006.01)
*H02K 13/00* (2006.01)
*H02K 11/00* (2016.01)
*H02K 11/35* (2016.01)
*H01R 43/10* (2006.01)
*F03D 3/00* (2006.01)
*F03D 3/06* (2006.01)
*H01R 39/12* (2006.01)
*H02J 7/35* (2006.01)
*H02S 10/12* (2014.01)
*H02S 40/32* (2014.01)
*H02S 40/38* (2014.01)
*G08B 5/36* (2006.01)

(52) U.S. Cl.
CPC ............... *G08B 5/36* (2013.01); *H01R 39/12* (2013.01); *H02J 7/35* (2013.01); *H02J 7/355* (2013.01)

(56) References Cited

U.S. PATENT DOCUMENTS

| | | | | |
|---|---|---|---|---|
| 7,726,934 B2* | 6/2010 | Cowan | | F03D 3/005 |
| | | | | 415/4.2 |
| 8,030,880 B2* | 10/2011 | Alston | | B60H 1/00428 |
| | | | | 320/103 |
| 8,061,993 B2* | 11/2011 | Sassow | | F03D 3/061 |
| | | | | 416/176 |
| 8,282,236 B2* | 10/2012 | Pelken | | F03D 9/007 |
| | | | | 362/183 |
| 8,299,645 B2* | 10/2012 | Muchow | | F03D 9/10 |
| | | | | 290/55 |
| 8,338,977 B2* | 12/2012 | Lee | | F03D 9/00 |
| | | | | 290/44 |
| 8,487,469 B2* | 7/2013 | Christy | | F03D 9/007 |
| | | | | 290/55 |
| 8,522,435 B2* | 9/2013 | Sassow | | F03D 3/061 |
| | | | | 29/889.21 |
| 8,678,768 B2* | 3/2014 | Sassow | | F03D 3/061 |
| | | | | 29/889.7 |
| 8,739,533 B2* | 6/2014 | Yogev | | F01D 1/026 |
| | | | | 60/641.12 |
| 8,915,697 B2* | 12/2014 | Pitre | | F03D 1/0658 |
| | | | | 415/1 |
| 9,133,820 B1* | 9/2015 | Jones | | F03D 3/005 |
| 9,151,273 B2* | 10/2015 | Christy | | F03D 9/007 |
| 9,528,498 B2* | 12/2016 | Bardia | | H02K 7/114 |
| 9,644,611 B2* | 5/2017 | Jones | | F03D 3/005 |
| 9,816,487 B2* | 11/2017 | Govind | | F03D 80/88 |
| 9,909,566 B2* | 3/2018 | Jones | | F03D 3/005 |
| 9,991,771 B2* | 6/2018 | Zhu | | H02K 21/024 |
| 10,094,361 B2* | 10/2018 | Bardia | | F03D 9/007 |
| 10,158,238 B2* | 12/2018 | Gochev | | H02J 7/35 |
| 10,247,168 B2* | 4/2019 | Gordic | | F03C 1/26 |
| 2008/0227378 A1* | 9/2008 | Yokoi | | F03D 3/005 |
| | | | | 452/64 |
| 2009/0079161 A1* | 3/2009 | Muchow | | F03D 9/10 |
| | | | | 280/400 |
| 2009/0085355 A1* | 4/2009 | ST-Germain | | F03D 3/067 |
| | | | | 290/52 |
| 2009/0107743 A1* | 4/2009 | Alston | | B60H 1/00428 |
| | | | | 180/65.21 |
| 2009/0244890 A1* | 10/2009 | Pelken | | F03D 9/11 |
| | | | | 362/192 |
| 2010/0101988 A1* | 4/2010 | Saeed | | F03D 3/005 |
| | | | | 210/171 |
| 2010/0133850 A1* | 6/2010 | Winkler | | F03D 3/005 |
| | | | | 290/55 |
| 2010/0278653 A1* | 11/2010 | Sassow | | F03D 3/061 |
| | | | | 416/223 R |
| 2011/0187117 A1* | 8/2011 | Hess | | B60K 16/00 |
| | | | | 290/55 |
| 2011/0215583 A1* | 9/2011 | Lee | | F03D 9/00 |
| | | | | 290/55 |
| 2012/0156041 A1* | 6/2012 | Sassow | | F03D 3/061 |
| | | | | 416/176 |
| 2012/0302228 A1* | 11/2012 | Gray | | H02J 3/382 |
| | | | | 455/422.1 |
| 2013/0170949 A1* | 7/2013 | Samuels | | F03D 9/007 |
| | | | | 415/1 |
| 2013/0343890 A1* | 12/2013 | Sassow | | F03D 3/061 |
| | | | | 416/170 R |
| 2015/0022005 A1* | 1/2015 | Jordan, Sr. | | F03D 9/007 |
| | | | | 307/72 |
| 2015/0152848 A1* | 6/2015 | Sustarsic | | F03D 3/005 |
| | | | | 416/132 B |
| 2015/0214821 A1* | 7/2015 | Zhu | | H02K 21/024 |
| | | | | 290/44 |
| 2015/0322920 A1* | 11/2015 | Jones | | F03D 3/005 |
| | | | | 416/1 |
| 2015/0345473 A1* | 12/2015 | Bardia | | H02K 7/114 |
| | | | | 290/44 |
| 2016/0141911 A1* | 5/2016 | Al-Garni | | H02J 7/35 |
| | | | | 307/48 |
| 2016/0201652 A1* | 7/2016 | Govind | | F03D 80/88 |
| | | | | 416/1 |
| 2016/0345399 A1* | 11/2016 | Gochev | | H02J 7/35 |
| 2017/0096985 A1* | 4/2017 | Bardia | | F03D 9/007 |
| 2017/0234303 A1* | 8/2017 | Jones | | F03D 3/005 |
| | | | | 290/55 |
| 2018/0313325 A1* | 11/2018 | Gordic | | F03C 1/26 |

* cited by examiner (a)

(b)

(a)

(b)

(a)

(b)

(a)

(b)

(a)

(b)

PHOTOVOLTAIC-WIND HYBRID TURBINE SYSTEM

CROSS-REFERENCE TO RELATED APPLICATION

This patent application claims priority from U.S. Provisional Patent Application No. 62/523,515 filed Jun. 22, 2017, which is herein incorporated by reference in its entirety.

FIELD OF THE INVENTION

The present invention relates to the field of wind turbines, and more particularly, a photovoltaic-wind hybrid turbine system comprising photovoltaic modules integrated with blades of a wind turbine for energy generation.

BACKGROUND OF THE INVENTION

A wind turbine is a device which converts kinetic energy of the wind into electrical energy or mechanical power. This mechanical power is used directly or in combination with a generator for conversion of the power into electricity, which is then distributed for use in residential buildings or homes, offices, schools etc.

Wind being a renewable source can be harnesses and used to generate power, inexhaustibly and is sustainable. Generation of wind energy does not cause pollution and requires no additional operational costs, after installation. Photovoltaic modules or panels absorb natural sunlight, another renewable source of energy to generate electricity. A photovoltaic module is generally a packaged assembly of a plurality of photovoltaic solar cells.

However, due to variations in ambient conditions, efficiency of these energy-generating systems is affected by undesired weather conditions and batteries are used for storing generated energy for the times when there is an absence of wind or at night. In sun-drenched hot climate regions, elevated temperatures and dust accumulation are considered critical due to their impact on the electrical performance of photovoltaic systems. Traditionally, a wide range of cooling techniques have been investigated and tested for thermal regulation of photovoltaic systems. Air and liquid based cooling of photovoltaic systems are a few among the researched techniques.

Passive cooling mechanisms refer to technologies used to extract or minimize heat absorption from the photovoltaic modules without additional power consumption. The mechanism implies transporting heat from where it is generated and dissipating it to the environment. The operating temperatures of photovoltaic modules increase due to absorbed solar radiations that are not converted into electricity, causing a decrease in the electrical efficiencies.

In traditional systems, photovoltaic modules or panels are stationary and their elevated operating temperatures deteriorate the electrical power generated from the modules. Excessive areas are also required for implementing photovoltaic panels and wind turbines.

Accordingly, there exists a need to provide a modified and hybrid turbine apparatus, which overcomes at least a part of the above disadvantages and using lesser components, which are easier to maintain.

SUMMARY OF THE INVENTION

Therefore it is an object of the present invention to provide a photovoltaic-wind hybrid turbine system comprising photovoltaic modules integrated with blades of a wind turbine, which rotate along with rotation of blades of the wind turbine, thus cooling down and improving overall performance of the photovoltaic-wind hybrid turbine system.

The present invention involves a photovoltaic-wind hybrid turbine system, comprising a vertical axis wind turbine, a plurality of photovoltaic modules integrated with a plurality of blades, wherein the plurality of blades are rotatable and fixed to the vertical axis wind turbine, and rotation of the plurality of photovoltaic modules integrated with the plurality of blades self-cools the plurality of photovoltaic modules during operation of the photovoltaic-wind hybrid turbine system, to enhance an output power of the photovoltaic-wind hybrid turbine system.

In another embodiment of the present invention, output power of the photovoltaic-wind hybrid turbine system comprises power generated from the vertical axis wind turbine and power generated from the plurality of photovoltaic modules.

In another embodiment of the present invention, the plurality of photovoltaic modules are flexible, light-weight and thin-film photovoltaic modules capable of being bent up to 30° to conform to a curvature of the plurality of blades.

In another embodiment of the present invention, dimensions of the plurality of photovoltaic modules match that of the plurality of blades such that aerodynamics of the photovoltaic-wind hybrid turbine system remain unaffected.

In another embodiment of the present invention, the vertical axis wind turbine is an H-type vertical axis wind turbine.

In another embodiment of the present invention, the vertical axis wind turbine comprises five blades separated equally by angles of 72°.

In another embodiment of the present invention, output voltage and front side temperature values of the plurality of photovoltaic modules are collected using slip rings, and sensed and recorded using an Arduino Uno microcontroller fixed on top of a rotor of the photovoltaic-wind hybrid turbine system.

In another embodiment of the present invention, integrated maximum power point tracker (MPPT) is used as a voltage regulator to increase efficiency of the plurality of photovoltaic modules.

In another embodiment of the present invention, the photovoltaic-wind hybrid turbine system is experimentally modelled by four parameters namely ideality factor, reverse saturation current, short-circuit current, and material band gap.

In another embodiment of the present invention, the power generated from the vertical axis wind turbine and the power generated from the plurality of photovoltaic modules is integrated using a hybrid charge controller (HCC).

In another embodiment of the present invention, output power of the photovoltaic-wind hybrid turbine system integrated using the hybrid charge controller (HCC) is used to charge a battery.

In another embodiment of the present invention, the hybrid charge controller (HCC) diverts power to a warning light when the battery being charged by the photovoltaic-wind hybrid turbine system gets full.

Another aspect of the present invention describes a method of manufacturing a photovoltaic-wind hybrid turbine system, the method comprising attaching a plurality of photovoltaic modules to a plurality of blades of a wind turbine using cable ties, fabricating slip rings by cutting a wooden board in a circular shape and making a hole in a middle portion of the wooden board enough for a shaft of the wind turbine to pass through and creating two circular even crevices on the wooden board and taking two sanded and cleaned smooth copper rings to fit within the crevices. The method of manufacture further includes gluing the fabricated slip rings to a bottom of the wind turbine and placing the slip rings underneath a generator, polishing surfaces of the slip rings to minimize any friction associated with the slip rings, fabricating a wooden base by cutting a wooden sheet, bolting down the wind turbine, a hybrid charge controller (HCC) and a battery to the wooden base and placing an on-off switch on top of the wooden base, and mounting an Arduino Uno microcontroller and an SD card on the photovoltaic-wind hybrid turbine system using cable ties.

Additional advantages, objects, and features of the invention will be set forth in part in the description which follows and in part will become apparent to those having ordinary skill in the art upon examination of the following or may be learned from practice of the invention.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
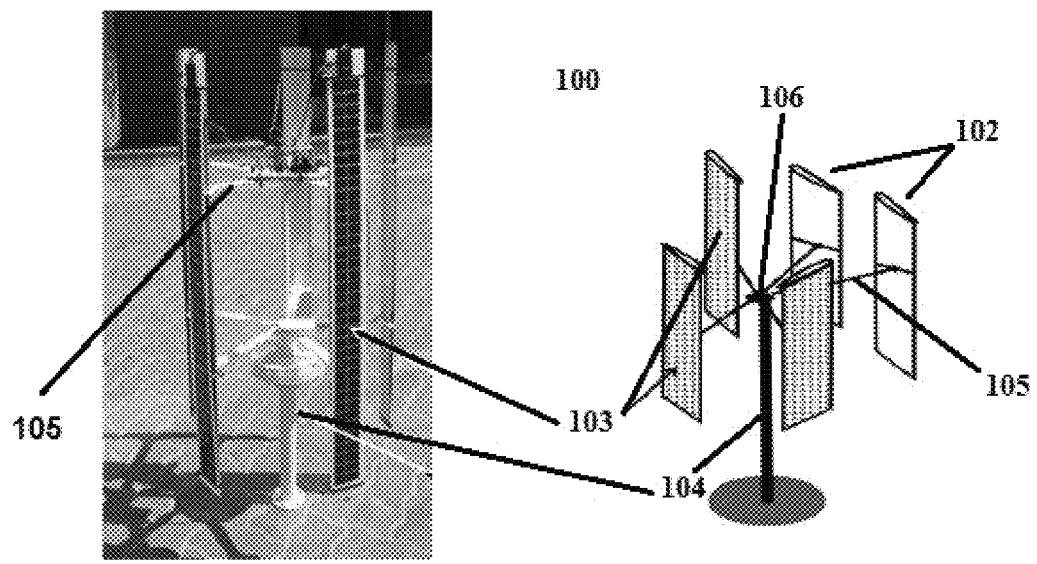
FIG. 1(a) shows the proposed photovoltaic-wind hybrid turbine system in accordance with the present invention.
FIG. 1(b) shows a top view of the hybrid turbine system in accordance with the present invention.
Figure 1:
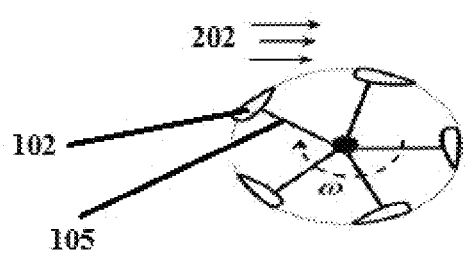

The aspects of the photovoltaic-wind hybrid turbine system according to the present invention will be described in conjunction with FIGS. 1-9. In the Detailed Description, reference is made to the accompanying figures, which form a part hereof, and in which is shown by way of illustration specific embodiments in which the invention may be practiced. Wherever possible, the same reference numbers are used in the drawings and the description to refer to the same or like parts. Directional terminology, such as "top", "bottom", "front", "back" "leading", "trailing" etc., is used with reference to the orientation of the Figure(s) being described. Since components of embodiments of the present invention can be positioned in a number of different orientations, directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The photovoltaic-wind hybrid turbine system according to the present invention provides a solution to the disadvantages faced by traditional photovoltaic systems in terms of maintenance and operation. A hybrid system configuration is used since different renewable energy resources have different production characteristics depending on ambient conditions. However, integrating photovoltaic systems with wind systems can compensate the existing drawbacks faced by each system and overcome the problem of varying ambient conditions. The strengths of one renewable energy source counterbalance the limitations of the other renewable source of energy. Combining various renewable energy sources sustain energy generation under different climatic conditions.

As shown in FIG. 1, the proposed photovoltaic-wind hybrid turbine system 100 comprises a plurality of flexible and thin film photovoltaic modules or panels 103 attached to a plurality of blades 102 of a vertical-axis wind turbine (VAWT). A vertical-axis wind turbine as opposed to a horizontal-axis wind turbine (HAWT) does not produce as much noise as produced by traditional turbines due to design differences and the path of motion of the plurality of blades. Further, vertical-axis wind turbines exhibit low noise and angular velocity during operation, and is capable of accepting wind from any direction, thus withstanding extreme weather conditions without significant damage.

In accordance with a preferred embodiment of the present invention, a plurality of flexible and thin film photovoltaic modules or panels 103 are attached on the blades 102 of an H-type vertical-axis wind turbine (VAWT) consisting of five blades 102 and separated equally by angles of 72°. The photovoltaic modules or panels 103 used in the present invention are lightweight, flexible and capable of being bent up to 30° in order to conform to the curvature of the blades 102. Dimensions of the photovoltaic modules or panels 103 match that of the blades 102 such that the aerodynamics of the wind turbine remain unaffected. FIG. 1(a) shows and illustrates the proposed photovoltaic-wind hybrid turbine system 100. FIG. 1(b) shows a top view of the hybrid turbine system. Speed of the wind $V_{wind}$ is denoted as 202 in FIG. 1(b).

Traditionally, operating temperatures of photovoltaic modules increase due to absorbed solar radiations that are not converted into electricity thus causing a decrease in the overall electrical efficiencies. This traditional disadvantage is mitigated when the plurality of blades 102 start rotating and the generated heat is exchanged with the surrounding environment faster than if the photovoltaic modules or panels 103 were stationary. This type of cooling is called passive cooling or self-cooling where no extra power consumption is needed. Since the photovoltaic modules or panels 103 cool down the overall performance of the photovoltaic-wind hybrid turbine system is improved. The main advantage of attaching the photovoltaic modules or panels 103 on the wind turbine blades 102 is to lower the operating temperature of the photovoltaic modules or panels 103 and prevent any dust accumulation on the photovoltaic modules or panels 103 as compared to conventional photovoltaic systems.

The main advantages of the proposed photovoltaic-wind hybrid turbine system 100 in accordance with the present invention is that the design combines a wind turbine with photovoltaic modules or panels 103 resulting in a reduced utilized area, Also, the rotating photovoltaic modules or panels 103 are self—cooling resulting in enhanced output power. The proposed design further eliminates a need to build a sun tracker since at least one rotating photovoltaic module or panel will face the sun at a particular instant of time. The plurality of blades 102 reflect back some incident sunlight towards other photovoltaic modules or panels 103 resulting in an increased output current from the photovoltaic modules or panels 103. The proposed photovoltaic-wind hybrid turbine system 100 results in more efficiency than that provided by a stationary turbine also due to reduced dust accumulation on the rotating photovoltaic modules or panels 103.

A wind turbine generates electricity by converting kinetic energy from natural wind into rotational energy. In accordance with the present invention, during operation of the photovoltaic-wind hybrid turbine system 100, natural wind causes the plurality of blades 102 to rotate which in turn causes the central axis of rotation or rotating shaft 104 to turn. The plurality of blades 102 are connected to the central axis of rotation or rotating shaft 104 through a plurality of radial arm structures 105. The central axis of rotation or rotating shaft 104 is further electrically connected to a generator or an alternator (not shown), which is located at the bottom of the rotating shaft. In another embodiment of the present invention, a three-phase AC permanent magnet generator (not shown) is located at the bottom of the rotating shaft of the H-type vertical-axis wind turbine (VAWT) system. At the core of the generator, powerful neodymium magnets (not shown) are used in place of excitation coils that are used in rotors of typical synchronous generators. The generator or alternator is responsible for conversion of the rotational energy from the plurality of blades 102 into electricity.

Considering a preferred embodiment of the present invention, the photovoltaic modules or panels 103 are integrated with the H-type vertical-axis wind turbine (VAWT) consisting of five blades 102, each blade with a height (h) of 0.745 m and a width (w) of 0.08 m. A rotor 106 of the wind turbine has a diameter (d) of 0.56 m. The wind has a speed of $V_{wind}$ (in m/s) which rotates the central axis of rotation or rotating shaft 104 with a speed N (in RPM) at a rotation frequency (in rad/s) of $$\omega = N\frac{2\pi}{60}$$

and the resulting turbine speed (in m/s) will be $$V_T = \omega\frac{d}{2}.$$

Figure 2:
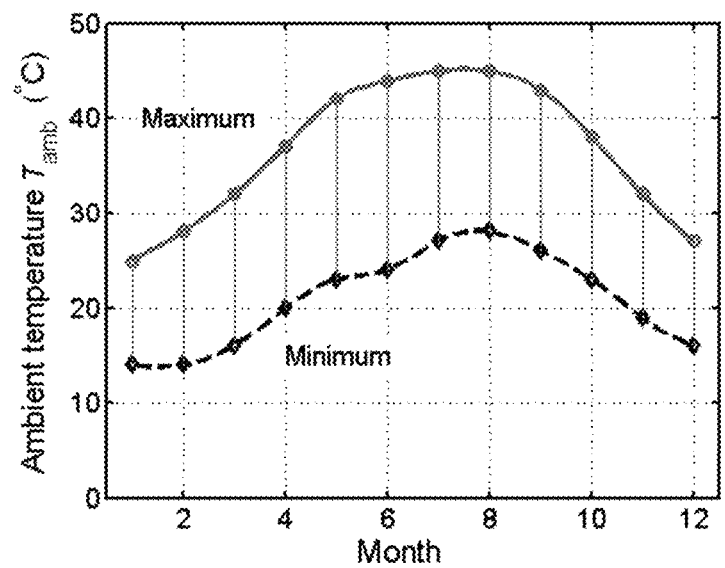
FIG. 2(a) provides a graphical representation of maximum and minimum values of ambient temperature measured in Abu Dhabi.
FIG. 2(b) provides a graphical representation of maximum, average and minimum values of wind speed measured in Abu Dhabi.
Figure 2:
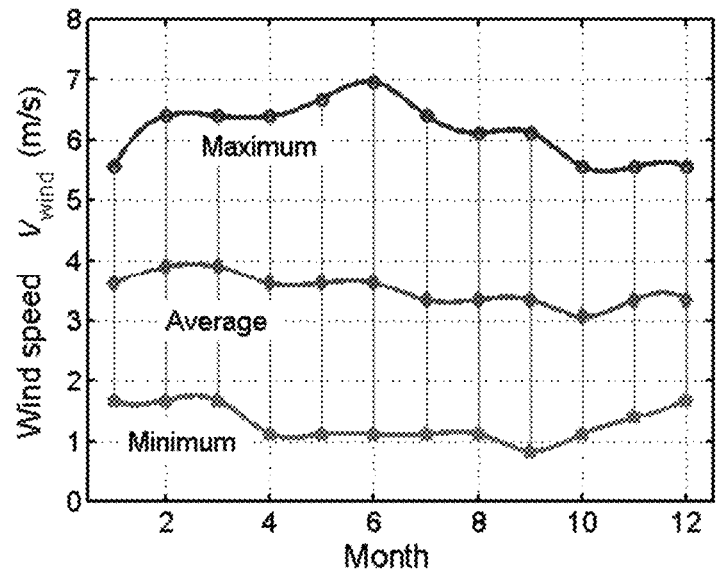

The proposed photovoltaic-wind hybrid turbine system was tested at Abu Dhabi University in the United Arab Emirates where the ambient temperature $T_{amb}$ varies during the day and night. Maximum and minimum values of the ambient temperature $T_{amb}$ as measured from Abu Dhabi are shown in FIG. 2 (a). FIG. 2(b) is a graphical representation of the maximum, average and minimum values of wind speed $V_{wind}$ measured in Abu Dhabi. The plurality of photovoltaic modules or panels 103 absorb natural sunlight and generate power while the wind turbine generates power by converting kinetic energy from natural wind into rotational energy through rotation of the plurality of blades 102. The power generated from the plurality of photovoltaic modules or panels 103 and the plurality of blades 102 is integrated using a hybrid charge controller (HCC). DC power is generated from the plurality of photovoltaic modules or panels 103 and AC power is generated from the plurality of blades 102 of the wind turbine. The hybrid charge controller (HCC) controls and mixes the generated DC and AC powers, and then stores the resultant power in a battery.

Figure 3:
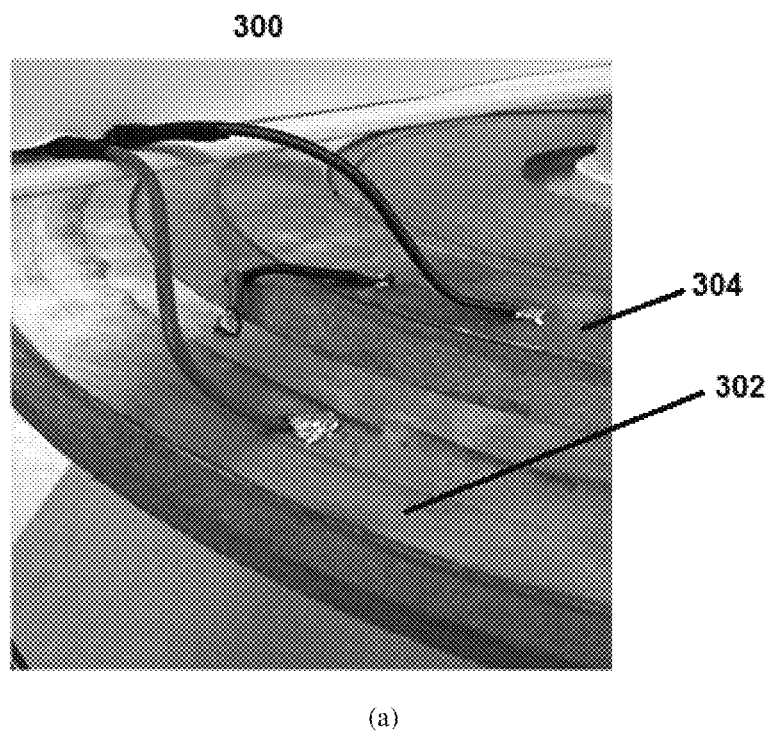
FIG. 3(a) depicts a fabricated slip ring in accordance with the present invention.
FIG. 3(b) depicts electrical brushing in accordance with the present invention.
Figure 3:
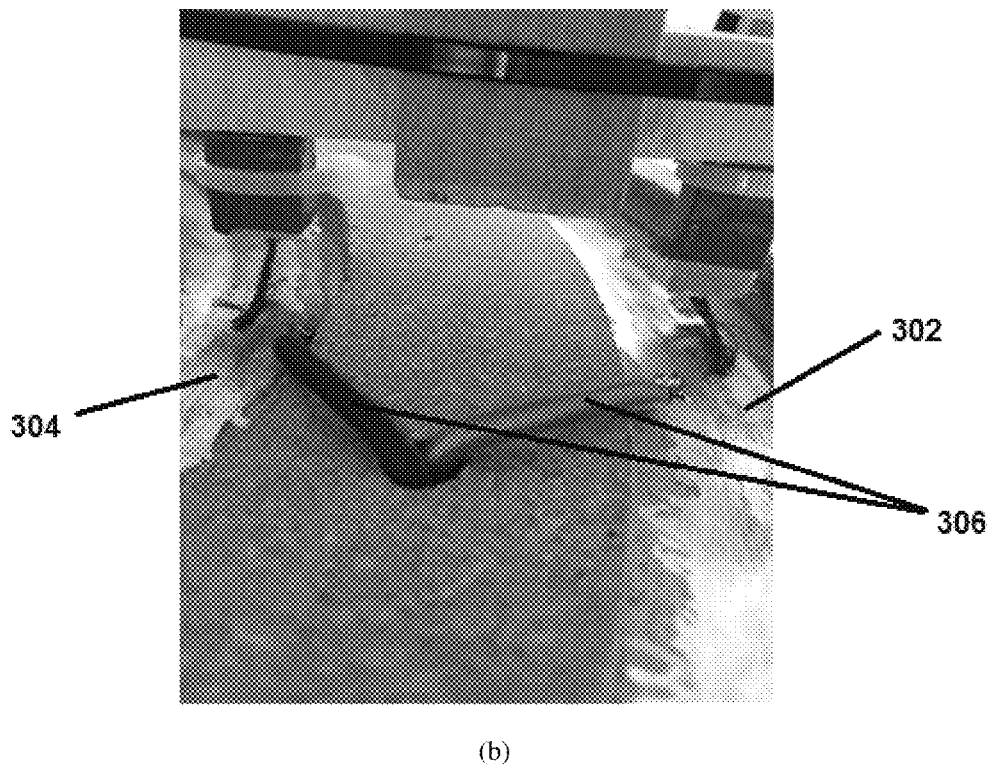

Due to the rotation of the plurality of blades 102 along with the photovoltaic modules or panels 103 of the photovoltaic-wind hybrid turbine system 100, electrical brushing is used to harvest electrical power generated from the photovoltaic modules or panels 103. Electrical brushing is the process by which moving or rotating parts are electrically connected to stationary parts by brushing stationary wires on the moving parts. In an embodiment of the present invention, slip rings are manufactured using two double sided copper plates and a wooden board. FIGS. 3 (a) and (b) show a fabricated slip ring 300 and electrical brushes. As shown in the FIG. 3, outer ring 302 of the slip ring is used for the positive terminals (denoted by red wires) of the photovoltaic modules or panels 103 and an inner ring 304 of the slip ring is used for the negative terminals (denoted by black wires). On an other side of the slip ring 300 are two stationary electrical wires 306 that brush on the outer and inner rings (302 and 304) resulting in electrical current being passed to the hybrid charge controller (HCC) and then to the battery.

In an embodiment of the present invention, the hybrid charge controller (HCC) is connected to two 12V batteries. Output voltage and front side temperature values of the plurality of photovoltaic modules or panels 103 is sensed and recorded using an Arduino Uno microcontroller, which is fixed on top of the rotor 106 of the wind turbine. Temperature T of the plurality of photovoltaic modules or panels 103 is governed by the ambient temperature $T_{amb}$ and incoming solar radiations φ, wherein higher the solar radiations φ, larger the temperature T will be for the same ambient temperature values $T_{amb}$.

Maximum Power Point Tracking (MPPT) is an algorithm included in charge controllers for extracting maximum available power from a photovoltaic module under certain conditions. The voltage at which the photovoltaic module can produce maximum power is called 'maximum power point' (or peak power voltage). In the present invention, integrated Maximum Power Point Tracking (MPPT) capability is utilized to increase the efficiency of the plurality of photovoltaic modules or panels 103. A maximum power point tracker (MPPT) charge is a device used as a voltage regulator in a circuit, which limits the amount of current being used to charge a battery and the amount of current being drawn from a battery in order to avoid damage to the battery and other components.

In accordance with another embodiment of the present invention, since the photovoltaic modules or panels 103 output much more voltage than the battery requires for getting charged, hybrid charge controller (HCC) converts excess voltage coming from the photovoltaic modules or panels 103 into current and thus charging is optimized and the amount of time to charge the battery is reduced.

Figure 4:
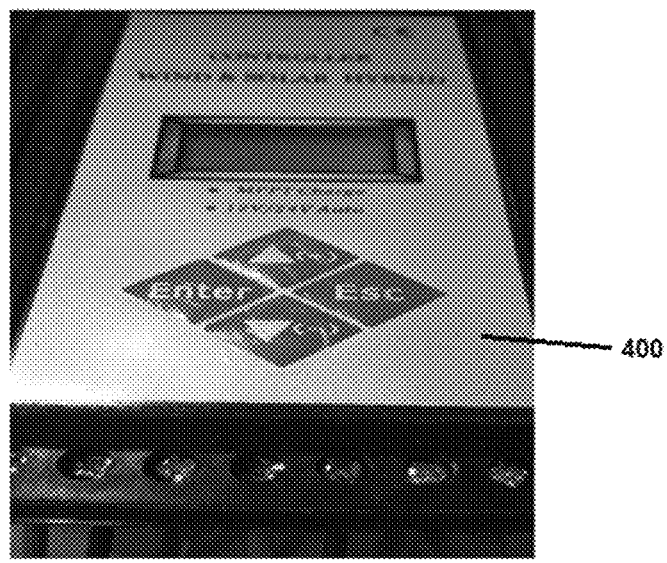
FIG. 4(a) illustrates a hybrid charge controller (HCC) in accordance with the present invention.
FIG. 4(b) illustrates a load or warning light in accordance with the present invention.
Figure 4:
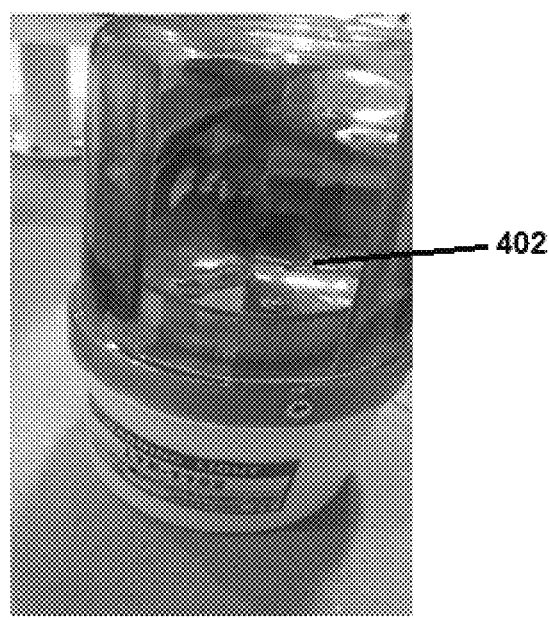

As shown in FIG. 4, when the battery being charged by the photovoltaic-wind hybrid turbine system 100 gets full, the photovoltaic-wind hybrid turbine system 100 continues to charge the battery and voltage generated cannot be "cut-off". In this case, the hybrid charge controller (HCC) 400 as shown in FIG. 4 (a) turns on and diverts energy to a load or a warning light 402 as shown in FIG. 4 (b). When the battery begins to discharge, the hybrid charge controller (HCC) 400 turns off thus allowing the turbine system 100 to continue charging the battery. The load or warning light 402 used in the present invention is a 10 W warning light which is a dump load for the turbine system 100 towards which energy is diverted. FIGS. 4 (a) and (b) show the hybrid charge controller (HCC) 400 and the warning light load 402 when the battery is fully charged.

In accordance with a proposed design of the present invention, the H-type vertical-axis wind turbine (VAWT) consisting of five blades 102 has a maximum power of 75 W, each blade with a height (h) of 0.745 m, a width (w) of 0.08 m and a rotor diameter (d) of 0.56 m. Projected turbine area A is given by A=h×d=0.417 m²

Power absorbed by the turbine $P_T$ is expressed as:

$$P_T = \frac{1}{2} \times C_p \times d \times h \times \rho \times V_{wind}^3, \quad (1)$$

wherein $C_p$ is the aerodynamic power coefficient, $\rho=10225$ kg/m³ is the air density, and $V_{wind}$ is the wind speed.

Figure 5:
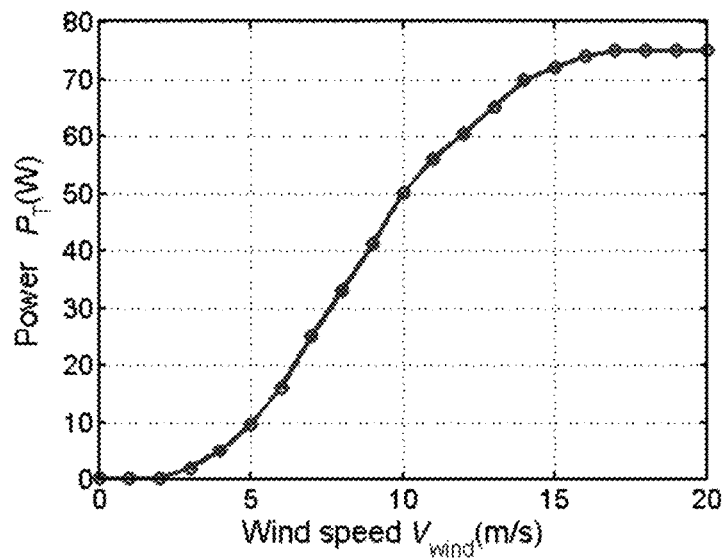
FIG. 5 provides a graphical representation of power characteristics of a H-type vertical-axis wind turbine (VAWT) in accordance with the present invention.

The H-type vertical-axis wind turbine (VAWT) displays a power characteristics curve as shown in FIG. 5, wherein wind speed $V_{wind}$ (m/s) is plotted against power $P_T$ (W). The curve depicts that the wind speed below which no power is produced (cut-in wind speed) is approximately 2 m/s and the wind speed at which the advertised power or expected output power is obtained (rated wind speed) is 17 m/s. It is common for the rated wind speed to increase with the size of the wind turbine because wind turbine tower height also increases. The H-type vertical-axis wind turbine (VAWT) in accordance with the present invention has a range between 5 m/s and 10 m/s, where the power is seen to rapidly increase, approximating the cubic dependence of equation (1). After a wind speed of 10 m/s, the turbine output power increases less rapidly as the wind turbine control system shifts away from attempting to maximize the power output. It is important to be able to control a turbine at high wind, so that it does not extract more power than can be absorbed by the generator.

Figure 6:
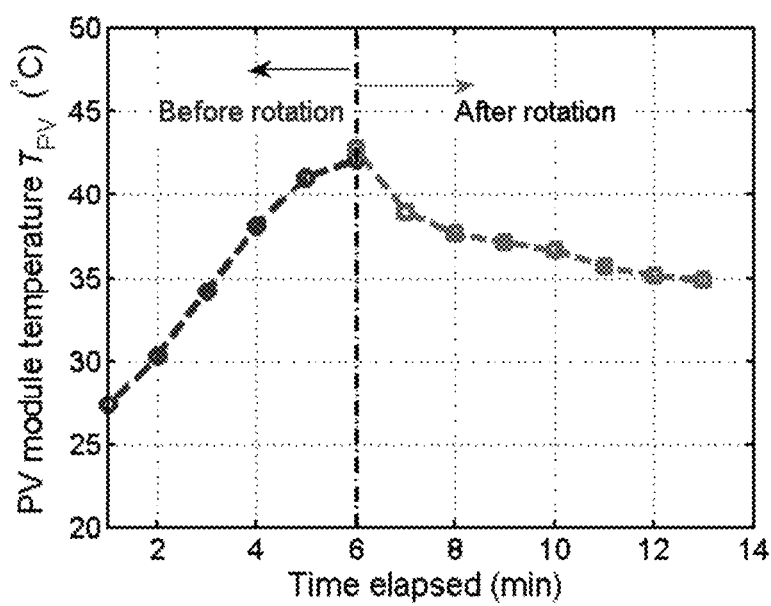
FIG. 6 provides a graphical comparison of measured photovoltaic modules or panels' surface temperature prior to rotation and after rotation of blades of the H-type vertical-axis wind turbine (VAWT) in accordance with the present invention.

Output voltage of the photovoltaic modules or panels 103 is 22V at standard test conditions. In order to validate an impact of rotating photovoltaic modules or panels 103 by their performance, in FIG. 6, the electrical characteristics of the photovoltaic modules or panels 103 are displayed in comparison before and after rotation of the H-type vertical-axis wind turbine (VAWT). A comparison of the measured photovoltaic modules or panels' surface temperature prior to rotation of the plurality of blades 102 (stationary state) and after rotation of the plurality of blades 102 of the H-type vertical-axis wind turbine (VAWT) is compared in FIG. 6. This comparison helps to evidence the enhancement of effectiveness or performance of the photovoltaic modules or panels 103 when the plurality of blades 102 commence to rotate. As seen in FIG. 6, the temperature of the photovoltaic modules or panels 103 decreases (experimentally measured from 42° C. to 35° C. in a period of 7 minutes) when the H-type vertical-axis wind turbine (VAWT) starts rotating. Keeping the photovoltaic modules or panels 103 as fixed or in a stationary position as in the traditional systems results in an increased operating temperature of the photovoltaic modules or panels 103 (experimentally measured from 28° C. to 42° C. in a period of 6 minutes) due to the reason that the photovoltaic modules or panels 103 continuously absorb solar radiations.

Current—voltage characteristics (I/V) of the photovoltaic modules or panels 103 are expressed as:

$$I = I_o \times \left(\exp\left(\frac{V - I \times R_s}{n \times V_{th}}\right) - 1\right) + \frac{V - I \times R_s}{R_p} - I_{sc} \quad (2)$$

wherein V is the applied voltage to the module, I is the resulting current, $V_{th}=25.9$ mV (at room temperature) is the thermal voltage, $\eta$ is the ideality factor, $I_{sc}$ is the short-circuit current, $R_s$ is the series resistance, $R_p$ is the shunt resistance and $I_o$ is the reverse saturation current. This reverse saturation current $I_o$ is expressed as:

$$I_o = I_{o\text{-}nom} \times \left(\frac{T_{PV}}{300}\right)^3 e^{\left(\left(\frac{T_{PV}}{300}-1\right) \times \frac{E_g}{n \times V_{th}}\right)} \quad (3)$$

Where $I_{o\text{-}nom}$ is the reverse saturation current at T=300K. The most affected electrical parameter of the photovoltaic modules or panels 103 is the open-circuit voltage $V_{oc}$ that decreases drastically when $T_{PV}$ increases as a result of the absorption of sun radiation. This effect is reflected directly on the electrical efficiency $\eta$ of the photovoltaic modules or panels 103.

Considering equations (2) and (3), open-circuit voltage $V_{oc}$ is approximated by assuming a reasonable large value of shunt resistance as:

$$V_{oc} = n \times V_{th} \times \left(\ln\left(\frac{I_{sc}}{I_{o\text{-}nom}}\right) - 3 \times \ln\left(\frac{T_{PV}}{300}\right) + \left(\left(\frac{T_{PV}}{300} - 1\right) \times \frac{E_g}{n \times V_{th}}\right)\right) \quad (4)$$

Figure 7:
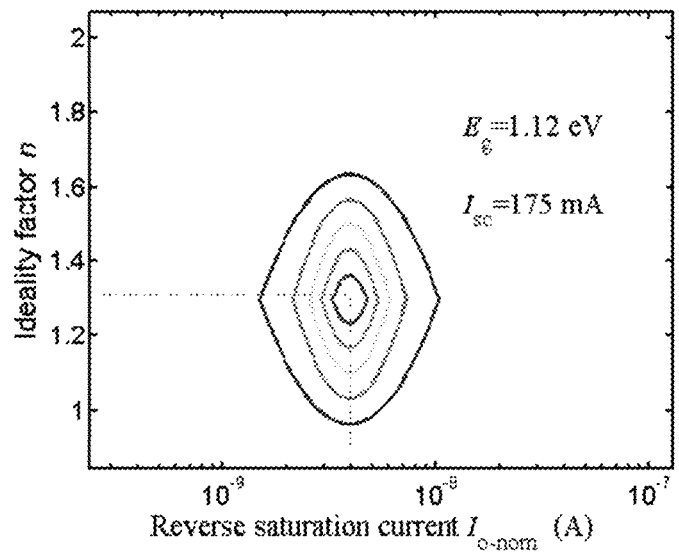
FIG. 7(a) shows optimum values of ideality factor and reverse saturation current graphically.
FIG. 7(b) shows that difference between measured and modelled data (A) is 1.2% in accordance with the present invention.
Figure 7:
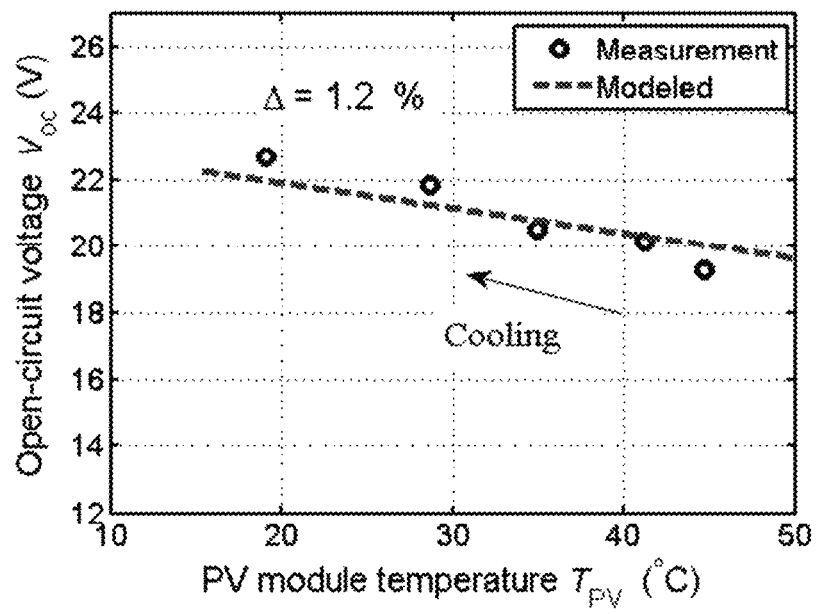

FIG. 7 is a graphical representation of measured and modelled open-circuit voltage plotted against measured photovoltaic modules or panels temperature. As shown in FIG. 7, modelling parameters are set (in MATLAB®) to n=1.3, $I_{o\text{-}nom}=4$ nA, $I_{sc}=175$ mA and $E_g=1.12$ eV. This results in a difference of $\Delta=1.2\%$ between measured and modelled data where $\Delta$ is defined as:

$$\Delta = \frac{1}{N}\sqrt{\sum_{i=1}^{N} \frac{(Measurement_i - Modeled_i)^2}{(Measurment_i)^2}}, \quad N = 5 \text{ readings} \quad (5)$$

FIG. 7 also shows that voltage decreases from 22.7 V to 19.3 V when temperature of the photovoltaic modules or panels 103 increases from 19° C. to 44° C. Therefore, cooling the photovoltaic modules or panels 103 by rotation of the same, increases the output voltage. FIG. 7(b) displays measured and modelled open-circuit voltage plotted against the measured photovoltaic modules or panels' temperature. FIG. 7(a) shows optimum values of the ideality factor and reverse saturation current. In accordance with the graph, optimum values of the ideality factor and reverse saturation current are 1.3 and 4 nA, respectively, and FIG. 7(b) shows that the difference between the measured and the modelled data (Δ) is 1.2%.

The benefit of the proposed design over traditional turbine systems is that electrical performance of the rotating photovoltaic modules or panels 103 is enhanced due to the self-cooling capability of the rotating photovoltaic modules or panels 103 integrated with the plurality of blades 102. It has been experimentally shown that voltage of the photovoltaic modules or panels 103 decreases when temperature of the photovoltaic modules or panels 103 temperature increases. Therefore cooling of the photovoltaic modules or panels 103 by rotation increases the output voltage and thus overall performance of the proposed photovoltaic-wind hybrid turbine system 100. This experiment is modelled by four parameters—ideality factor, reverse saturation current, short-circuit current, and material band gap.

Figure 8:
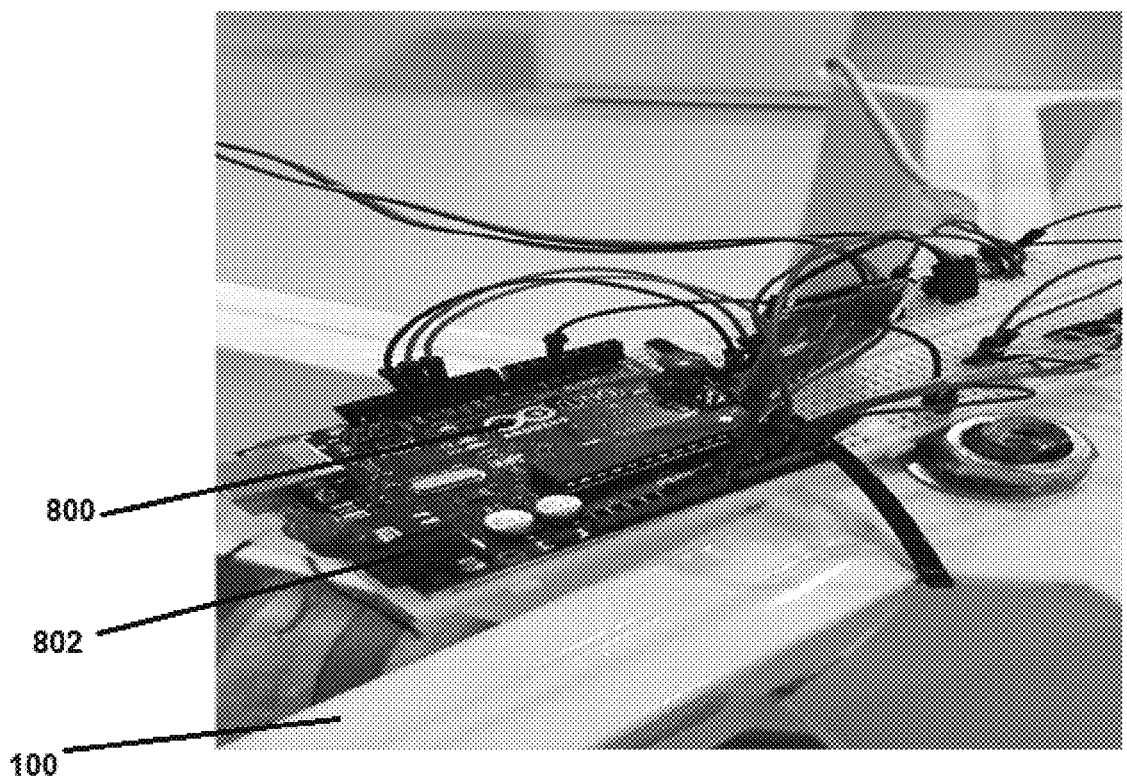
FIG. 8 shows an Arduino Uno microcontroller in accordance with the present invention.
Figure 9:
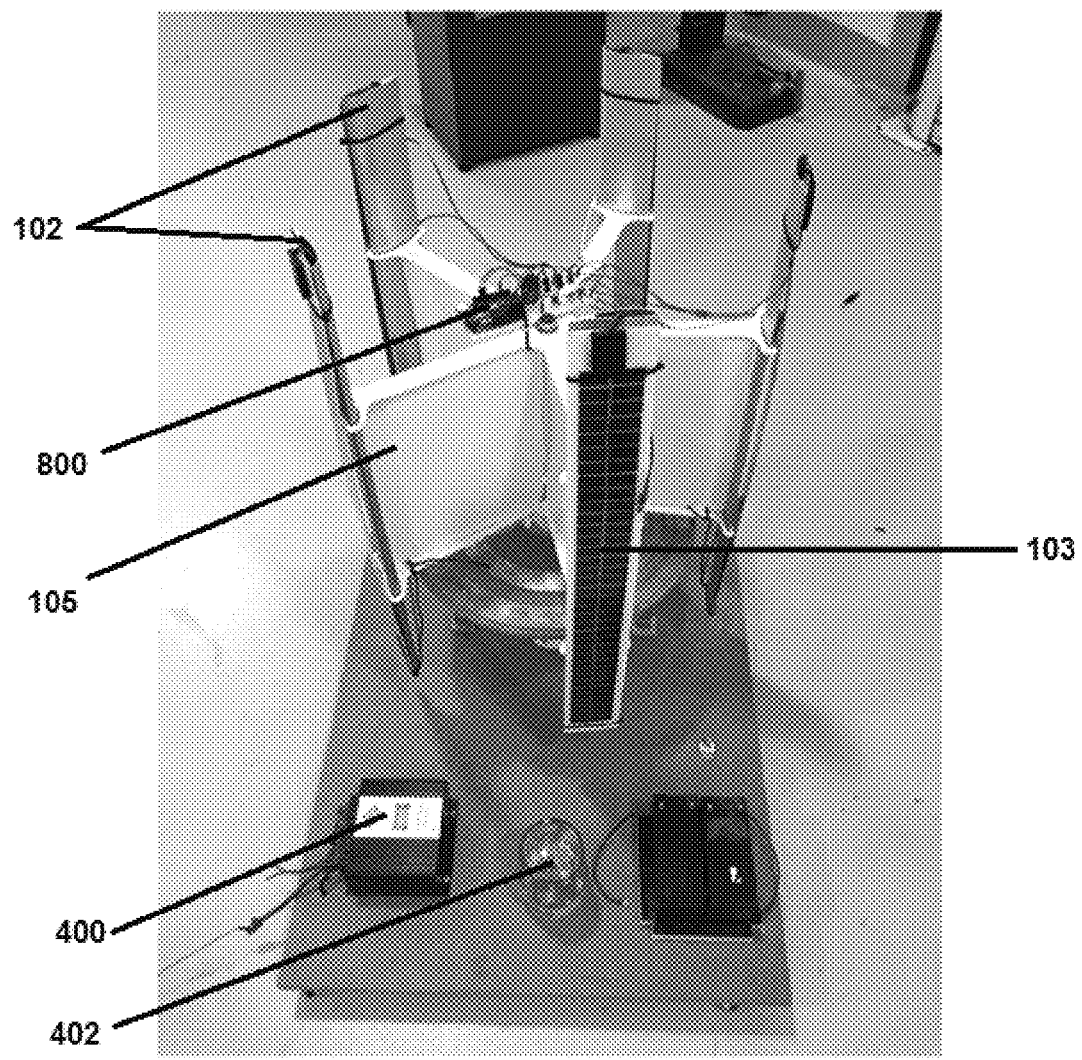
FIG. 9 shows an overall arrangement of the photovoltaic-wind hybrid turbine system in accordance with the present invention.

As shown in FIG. 8, a breadboard circuit containing the Arduino Uno microcontroller 800 and the SD card 802 are mounted on the photovoltaic-wind hybrid turbine system 100 using cable ties. FIG. 9 shows a representation of the overall photovoltaic-wind hybrid turbine system 100. Manufacturing steps used to build the overall system include attaching five photovoltaic modules or panels to the blades of the wind turbine using two cable ties for each panel, one on the top and one on the bottom. Further, five sturdy and light cardboard sheets of dimensions 23.5 cm×30 cm are cut and each cardboard sheet is fitted into an empty space bounded by two horizontal aluminum frames holding the blade, vertical blade and vertical shaft of the turbine. Slip rings are fabricated by cutting a wooden board in a circular shape with a diameter of 42 cm and making a hole in the middle of the wooden board enough for the shaft of the wind turbine to pass through. Following this, two circular even crevices are created on the circular wooden board (both 3 cm wide and about a few mm deep), the circular crevices about 3 cm apart. Two sanded and cleaned smooth copper rings that fit exactly into the crevices are taken and the structure is glued to the bottom the wind turbine placing the slip ring underneath the generator. Any friction associated with the slip rings is eliminated or minimized by polishing surfaces of the slip rings. The lower the friction the higher the speed of the wind turbines and therefore higher electrical output power. A wooden base is then fabricated by cutting a wooden sheet of dimensions 80 cm×60 cm.

The wind turbine, the hybrid charge controller (HCC) and the battery are bolted down to the wooden base and an on/off switch is placed on top of the wooden base. Holes being drilled are made big enough to allow any wiring coming from the photovoltaic-wind hybrid turbine system to go underneath and to the hybrid charge controller (HCC) and battery.

An LM35 temperature sensor is a precision IC (integrated circuit) used which senses temperature by giving an output voltage directly proportional to Centigrade temperature. The LM35 temperature sensor does not require any calibration in order to obtain an error range of +/−0.25° C. at room temperature and +/−0.75° C. at a range of −55° C. to 150° C. which is an advantage over Kelvin calibrated temperature sensors since no subtraction is required to be performed from the output voltage to obtain a value in centigrade.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A photovoltaic-wind hybrid turbine system, comprising:
  a vertical axis wind turbine;
  a plurality of photovoltaic modules integrated with a plurality of blades,
  wherein the plurality of blades are rotatable and fixed to the vertical axis wind turbine; and rotation of the plurality of photovoltaic modules integrated with the plurality of blades self-cools the plurality of photovoltaic modules during operation of the photovoltaic-wind hybrid turbine system, to enhance output power of the photovoltaic-wind hybrid turbine system,
  the power generated from the vertical axis wind turbine and the power generated from the plurality of photovoltaic modules is integrated using a hybrid charge controller (HCC).

2. The photovoltaic-wind hybrid turbine system as claimed in claim 1 wherein, output power of the photovoltaic-wind hybrid turbine system comprises power generated from the vertical axis wind turbine and power generated from the plurality of photovoltaic modules.

3. The photovoltaic-wind hybrid turbine system as claimed in claim 1 wherein, the plurality of photovoltaic modules are flexible, light-weight and thin-film photovoltaic modules capable of being bent up to 30° to conform to a curvature of the plurality of blades.

4. The photovoltaic-wind hybrid turbine system as claimed in claim 1 wherein, dimensions of the plurality of photovoltaic modules match that of the plurality of blades such that aerodynamics of the photovoltaic-wind hybrid turbine system remain unaffected.

5. The photovoltaic-wind hybrid turbine system as claimed in claim 1 wherein, the vertical axis wind turbine is an H-type vertical axis wind turbine.

6. The photovoltaic-wind hybrid turbine system as claimed in claim 1 wherein, the vertical axis wind turbine comprises five blades separated equally by angles of 72°.

7. The photovoltaic-wind hybrid turbine system as claimed in claim 1 wherein, output voltage and front side temperature values of the plurality of photovoltaic modules are collected using slip rings, and sensed and recorded using an Arduino Uno microcontroller fixed on top of a rotor of the photovoltaic-wind hybrid turbine system.

8. The photovoltaic-wind hybrid turbine system as claimed in claim 1 wherein, integrated maximum power point tracker (MPPT) is used as a voltage regulator to increase efficiency of the plurality of photovoltaic modules.

9. The photovoltaic-wind hybrid turbine system as claimed in claim 1 wherein voltage and temperature variations of the photovoltaic-wind hybrid turbine system are graphically depicted using parameters.

10. The photovoltaic-wind hybrid turbine system as claimed in claim 1 wherein, output power of the photovoltaic-wind hybrid turbine system integrated using the hybrid charge controller (HCC) is used to charge a battery.

11. The photovoltaic-wind hybrid turbine system as claimed in claim 10 wherein, the hybrid charge controller (HCC) diverts power to a warning light when the battery being charged by the photovoltaic-wind hybrid turbine system gets full.

12. A method of manufacturing a photovoltaic-wind hybrid turbine system, the method comprising:
    attaching a plurality of photovoltaic modules to a plurality of blades of a wind turbine using cable ties;
    fabricating slip rings by cutting a wooden board in a circular shape and making a hole in a middle portion of the wooden board enough for a shaft of the wind turbine to pass through;
    creating two circular even crevices on the wooden board and taking two sanded and cleaned smooth copper rings to fit within the crevices;
    gluing the fabricated slip rings to a bottom of the wind turbine and placing the slip rings underneath a generator;
    polishing surfaces of the slip rings to minimize any friction associated with the slip rings;
    fabricating a wooden base by cutting a wooden sheet;
    bolting down the wind turbine, a hybrid charge controller (HCC) and a battery to the wooden base and placing an on-off switch on top of the wooden base; and
    mounting an Arduino Uno microcontroller and an SD card on the hybrid turbine system using cable ties.

* * * * *